Patented May 26, 1925.

1,538,910

UNITED STATES PATENT OFFICE.

WILLIAM E. STOKES, OF ROCKVILLE CENTER, NEW YORK, ASSIGNOR TO ROYAL BAKING POWDER COMPANY, OF NEW YORK, N. Y., A CORPORATION OF NEW JERSEY.

PROCESS OF PREPARING ACID PHOSPHATE.

No Drawing. Application filed January 24, 1923. Serial No. 614,679.

*To all whom it may concern:*

Be it known that I, WILLIAM E. STOKES, a citizen of the United States, residing in Rockville Center, Nassau County, in the State of New York, have invented new and useful Improvements in Processes of Preparing Acid Phosphate, of which the following is a specification.

The invention relates to a process for preparing acid phosphate, and has for its principal objects the production of exceptionally pure monobasic phosphate at comparatively small cost. Monocalcium phosphate, for instance, produced by usual methods contains a considerable percentage of dicalcium phosphate and a small percentage of free phosphoric acid. It has been found impracticable to eliminate the free phosphoric acid without materially reducing the acid strength by reaction between the neutralizing agent or agents and a portion of the monocalcium phosphate, forming dicalcium phosphate. An object of the invention is the production of monocalcium phosphate substantially free from dicalcium phosphate or free phosphoric acid, or containing amounts thereof so small as not materially to affect the stability or acid strength of the phosphate.

I have discovered that by drying a solution of monocalcium phosphate in which there is sufficient free phosphoric acid to keep the dicalcium phosphate from being precipitated and then mixing with this substantially dry product, finely divided calcium carbonate or other neutralizing agent, an exceptionally pure monocalcium phosphate is obtained. I prefer to use calcium carbonate as the neutralizing agent, because its reaction with phosphoric acid does not occasion the difficulties resulting from endothermic reactions. I have found that the addition of the neutralizing agent in substantially dry form to the substantially dry powder produces a better product, and also makes available processes wherein the solution of monocalcium phosphate is dried and purified without the difficulties and expenses (as, for instance, the common treatment with sulphuric acid) involved in present practice, and thus decreases the cost of manufacture.

In the practice of the invention, a solution of monocalcium phosphate containing some free phosphoric acid is substantially dried, preferably by spray or vacuum drying, at proper temperature. If the solution has been made, as is common, by partially neutralizing a solution of phosphoric acid with some calcium salt, followed by filtering, it may contain approximately six per cent, more or less, of free acid. To the product resulting from substantially drying this solution, is added sufficient substantially dry neutralizing agent, preferably somewhat more than half as much calcium carbonate as there is free acid present. It is desirable to add more than the amount theoretically necessary to neutralize the free acid, because the excess is of value in stabilizing and preventing dissociation of the phosphate molecule. The result is a monocalcium phosphate of higher strength than those commonly used, free from free phosphoric acid. Calcium phosphate is mentioned, but it will be understood that the application of the invention to ammonium, magnesium and other phosphates, is contemplated. I have found that this dry neutralization is not only effective, but avoids the difficulties connected with efforts to neutralize free phosphoric acid in acid phosphate solutions of varying moisture content.

I claim:—

1. A process for preparing monobasic phosphate comprising dehydrating a solution of monobasic phosphate containing some free phosphoric acid and mixing with the substantially dry product thereof, substantially dry calcium carbonate.

2. A process for preparing monobasic phosphate comprising dehydrating a solution of monobasic phosphate containing some free phosphoric acid and mixing with the substantially dry product thereof, a substantially dry neutralizing agent.

3. A method of stabilizing acid phosphate comprising adding calcium carbonate to substantially dry acid phosphate.

WILLIAM E. STOKES.